May 31, 1932.  L. T. TROLAND  1,860,912

TWO-STAGE METHOD OF DYEING FILMS AND RESULTING PRODUCT

Filed May 24, 1928

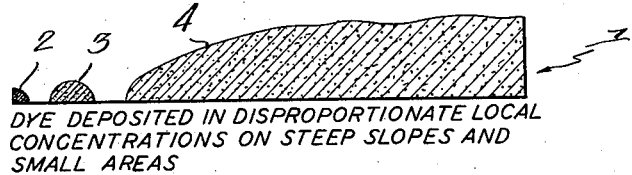

DYE DEPOSITED IN DISPROPORTIONATE LOCAL CONCENTRATIONS ON STEEP SLOPES AND SMALL AREAS

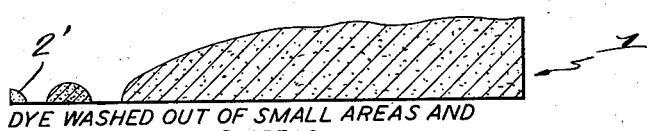

DYE WASHED OUT OF SMALL AREAS AND REDUCED IN OTHER AREAS

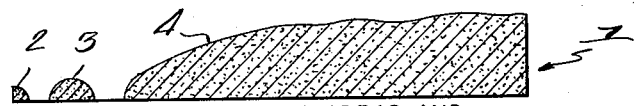

DYE RESTORED IN SMALL AREAS AND RENDERED PROPORTIONAL TO FILM DEVELOPMENT THROUGH OUT

Inventor
Leonard T. Troland
by Roberts, Cushman & Woodbury
Attys.

Patented May 31, 1932

1,860,912

UNITED STATES PATENT OFFICE

LEONARD T. TROLAND, OF CAMBRIDGE, MASSACHUSETTS, ASSIGNOR, BY MESNE ASSIGNMENTS, TO TECHNICOLOR MOTION PICTURE CORPORATION, OF BOSTON, MASSACHUSETTS, A CORPORATION OF MAINE

TWO-STAGE METHOD OF DYEING FILMS AND RESULTING PRODUCT

Application filed May 24, 1928. Serial No. 280,289.

This invention relates to a method of treating selectively wetting or absorbing surfaces, such as cinematographic films, and to the products resulting from the application of the invention. The invention is applicable to processes in which the image or developed areas are rendered dye absorptive and also to processes in which the non-image or undeveloped areas are rendered dye absorptive.

It is well known in the photographic art to develop images in or upon photographic surfaces, such as gelatine, and to then color the same by treating with a dye solution. The latter is known to be selectively absorbed by the developed (or undeveloped) areas more or less in direct (or inverse) proportion to the degree of development. Such absorptive surfaces may be further characterized by presenting a relief contour corresponding to the images and to the degree of exposure or development to which they have been subjected.

But films or other surfaces, which have been thus colored, frequently do not present the same relative or proportionate color or density contrasts as the original images which they are intended to simulate and hence fail to be accurate reproductions. They may also fail to produce accurate reproductions when they are used as matrix films for printing, as by imbibition or like procedure. These failures may be attributed to disproportionate distribution or excess of the color substance in certain densities relative to others, or to subsequent disproportionate migration of the color by diffusion or the like in the printing process.

It is therefore an object of this invention to provide a method for the treatment of selectively absorptive or adsorptive surfaces, such as cinematographic films and more especially developed films having relief images such as those used as matrices for imbibition printing. It is a further object to treat such surfaces with color substances, for example dye solutions, in such a manner as to impart a coloration thereto which shall correspond in color values, contrasts, and absolute densities to those exhibited by the original subject which the developed images in the surfaces represent. Another object is to so apply the color substance to the surface that, upon effecting inbibition contact with a second surface the latter will acquire therefrom a colored image which is the ectype of the first, and, visually, a true replica of the original subject which it represents. Other objects will appear from the following disclosure.

The invention comprehends generally the provision of a developed surface, having images thereon or therein which are characterized by variations in the degree to which the several parts are wet by and absorptive or adsorptive of color solutions or suspensions; and includes the steps of treating the surface with a dye solution (preferably of predetermined uniform concentration and for a sufficient time to permit the maximum density desired to be acquired by the surface), removing the excess accumulations of color substance therein, as by washing with an appropriate solvent of the color, and thereafter subjecting the surface to a second treatment with a color solution or suspension, (which may be the same as, or different from the first, as hereinafter pointed out) under predetermined conditions of control,— usually of less concentration or for a shorter period of time than the first, or both. The surface may be rinsed to remove any excess of the solution adhering thereto, if necessary, and then allowed to dry, or may be employed directly, as for imbibition printing or the like.

In practice, the available dyes for dyeing the thus prepared matrix film (e. g. green) may yield too high a contrast by a single bathing of the film. If it is attempted to avoid this by employing a lower dye concentration or a shorter time of bathing,— a poor Hunter and Diffield curve results where high densities are reduced but middle and low densities are not proportionately reduced. By dyeing (or bathing) to full contrast (or nearly so) and then washing back the curve can be changed in a manner opposite to that produced by short bathing, low and medium densities are reduced faster (or more) than the high ones. But the very low densities are then made too low when the high and medium are about right. Accordingly, the low densities are restored by a second short time bathing in the dye solution.

The invention will be described with reference to its application for the treatment of cinematographic matrix films, having developed images thereon (which typically present wide variations of contrast and color densities, and in corresponding reliefs) preliminary to employing the same for the imbibition printing of other films therefrom, in known ways. To this end, the matrix film may be exposed directly to the original subject and then developed, or may be exposed through a suitably prepared negative film and then developed, according to the well-known practices of the art.

Reference may be made to the accompanying drawings, in which

Fig. 1 is a cross section of a dye-treated matrix film;

Fig. 2 is a cross section of the same after washing;

Fig. 3 is a cross section of the same after redyeing.

The matrix film 1 may then be passed through a tank of dye solution in which it is immersed for a period of time sufficient to permit the most highly developed areas of the film to take up their full quantity of dye. This quantity is not necessarily the total amount of dye substance which the surface will absorb and retain, but usually is preferred to be somewhat greater than that required to yield the maximum needed absorption of light of the color in question, either of reflection or of transmission as the case may be.

In this step ordinarily the dye substance will not only be absorbed and upon the developed surfaces in proportion to their several degrees of development, but it will also penetrate into the surface in accordance with a similar law. In the case of a relief matrix film, the sides of the smaller relief surfaces (as at 2 in the drawings) present a greater proportionate area than do the larger relief surfaces 3, 4, and the deposition of dye may be to some extent directly proportional to the areas of such developed surfaces. The more intensively absorptive areas may also accumulate a greater density of dye than is necessary. Consequently, when green dye is employed, for example, the green may be too dense in the high density region to balance the red in the high density portions.

In order to remedy this condition the colored film may now be washed, as by immersing or passing through a body of water. This removes the superficial deposits of dye quite rapidly from the more densely colored areas, and also from those parts which are supposed to be clear and hence non-adsorptive, and at the same time removes dye substance (though somewhat more slowly, as by diffusion) from the less densely colored portions of the film as indicated in Fig. 2. When this has proceeded far enough to bring the high density greens into balance with the high density reds, or slightly beyond this point, the low density greens may have lost an appreciable proportion or all of their acquired color. Therefore, when this action has gone far enough, for example to reduce the darkened or most intense areas to the desired density or quantity of dye (e. g., to correspond to the high density reds) the film is removed and may be blown off to remove adhering solution of dissolved dye. It is then usually found that an excessive amount of dye has been removed from the lighter density regions as indicated at 21. In order to restore this without a proportionate darkening of the denser regions the film may now be given a second treatment, with a dye solution which is principally distinguished from the first treatment either in the duration of treatment or in the characteristics of the dye solution, or both. Thus, the second dye solution may be the same as the first, but the film allowed to remain in contact with it for a much shorter period. For example, while the contact or immersion of the film with the first dye solution may be a matter of several minutes, the treatment with the second dye solution is preferably for a few seconds only.

Likewise, the concentration of the second dye solution may be so regulated as to control the rate and degree of color absorption by the film surface, and even to control the sense of the dyeing operation, that is to say, whether the film shall acquire more dye or shall lose some of that already absorbed. Thus, if the solution is extremely dilute, the more intensely dyed areas may tend to lose dye substance to the second dye solution while the lighter or less densely dyed areas may be capable of further dye absorption or adsorption. Conversely, with more concentrated solutions all of the developed areas may be capable of absorbing dye therefrom. In the latter case, since the less densely developed and dyed areas absorb more rapidly and approach their maximum of values more quickly than the more densely developed and dyed areas which already contain a relatively high absolute quantity of dye, the contrasts in the portions of lower development are enhanced rapidly while those of higher development (in which contrast has already been brought out, by removal of excess dye accumulations in the washing stage) may be less affected—or, as above indicated, may either receive no further increments of color substance or actually liberate residual excesses to the dye solution. In this way, the color (green, for example) is brought up to the desired values throughout the ranges of development as indicated in Fig. 3, restoring the washed-out portions and adjusting the portions of higher density to balance the other color or colors (such as red) with respect to which it is complementary.

It is also to be observed that the second treatment may be carried out with a different color substance from that employed in the first treatment. This procedure can be used for various purposes, (e. g. (1) to produce dichroic effect (such as blue skies); (2) to avoid or neutralize a dichroic effect already present; (3) to secure especially good definition in lighter densities for which purpose the second dye may be of sharp definition even if flat) but has the general effect of modifying the lower densities of the first color to produce or to remove a dichroic effect. For example, by using a blue color solution the lighter densities could be bluish, whereas the higher ones are more greenish, thus favoring the rendering of blue skies simultaneously with dark green foliage. Also, if the second dyeing is made nearly neutral or gray in color, the low density details can be restored in terms of luminosity contrast, without necessarily making them appreciably greener.

The result is, in general, a distribution of color substance upon and to some extent in the surface of the dyed matrix film, corresponding accurately to those occurrences of the color in the original subject which the developed image represents. Moreover, while such relative color distribution over the areas of the developed film is thus brought to its proper value for the desired result, the color substance in any given portion is of uniform properties.

The film may now be dried if it is to be regarded as the finished product. As a matrix film for imbibition printing of other films, however, it is suitable for direct contact with the surface to be printed. To this end, a blank film, preferably having a hardened gelatine surface, may be subjected to a preliminary uniform wetting with water, and then brought into intimate contact with the dyed surface of the matrix. A slight pressure is imparted to the contacting surfaces, and the condition of imbibition contact is maintained for a suitable period of time to permit the substantially complete transfer of color substance from the matrix film to the blank surface. They are then separated and the printed blank is allowed to dry, while the matrix film is in a suitable condition for reuse directly or after the removal of any traces of residual dye in case complete transfer has not been effected.

If the process is properly carried out, the matrix film, and hence the printed blank so produced, are found to present (by either reflected or transmitted light) an improved reproduction not only in relative light intensities, shades and contrasts, but also in absolute densities, color tones and values. The latter is especially significant when the printed film is subsequently printed (in a like manner, by a repetition of the described steps or otherwise) with a color complementary with respect to the first. Thus, if the first color imparted to the film is green (from a matrix developed with respect to the green colorations of the original subject) and the film is then printed from a second matrix film in red (from a matrix film developed with respect to the red colorations of the original subject) component colors in the printed images made up from green and red, such as browns, etc., will be truly reproduced as well as the varying shades and contrasts in the green and red areas severally.

Numerous modifications and substitutions may be made in adapting the invention to its various applications in the several arts to which it is related. Such modifications and substitutions are, however, comprehended by the above disclosure and to be considered as included within the terms of the following claims.

I claim:

1. Method of coloring cinematographic films having a preferentially absorptive surface, which comprises successively subjecting the same to a plurality of coloring liquids, with intermediate removal of a part of the color substance deposited in the first treatment.

2. Method of coloring cinematographic films having a preferentially absorptive surface, which comprises successively subjecting the same to a plurality of coloring liquids, with intermediate removal of a part of the color substance to leave a predetermined maximum concentration of color substance on the surface, preliminary to the succeeding operation.

3. Method of coloring cinematographic films having a preferentially absorptive surface, which comprises treating the same with a coloring liquid susceptible of preferential absorption by the surface, removing a part of the color substance deposited in the said treatment, and subjecting the surface to a second treatment with a coloring liquid, characterized by a lesser degree of absorption than the first.

4. Method of coloring cinematographic films having a preferentially absorptive surface, which comprises treating the same with a coloring liquid susceptible of preferential absorption by the surface, removing a part of the color substance deposited in said treatment, and subjecting the surface to a second treatment with a coloring liquid, said second treatment being characterized by a shorter period of duration than the first.

5. Method of coloring cinematographic films having a preferentially absorptive surface, which comprises treating the same with a coloring liquid susceptible of preferential absorption by the surface, removing a part of the color substance deposited in the first treatment, and subjecting the surface to a second treatment with a coloring liquid, said second coloring liquid being unlike the first coloring liquid.

6. Method of coloring cinematographic films having a preferentially absorptive surface, which comprises treating the same with a coloring liquid susceptible of preferential absorption by the surface, removing the color substance deposited in the first treatment to a predetermined value, and subjecting the surface to a second treatment with a coloring liquid, the second treatment being characterized by a solution of lower concentration than the first.

7. Method of coloring cinematographic films having a preferentially absorptive surface, which comprises treating the same with a coloring liquid susceptible of preferential absorption by the surface, removing the color substance deposited in the first treatment to a predetermined value, and subjecting the surface to a second treatment with a coloring liquid, the second treatment being characterized by a shorter period of duration than the first and with a solution of lower concentration than the first.

8. Method of coloring cinematographic films having a preferentially absorptive surface, which comprises treating the same with a coloring liquid susceptible of preferential absorption by the surface, removing the color substance deposited in the first treatment to a predetermined value, and subjecting the surface to a second treatment with a coloring liquid, the second treatment being characterized by a shorter period of duration than the first, the color being the same as the first color substance, but in a solution of lower concentration than the first.

9. Method of coloring cinematographic films having a preferentially absorptive surface, which comprises treating the same with a coloring substance susceptible to preferential absorption by the surface, removing the color substance deposited in the first treatment to below the maximum of selective light absorption, and subjecting the surface to a second treatment with a color substance, the second treatment being characterized by the employment of a color substance bearing a predetermined relationship to the preferential absorption properties of the surface to be treated therewith.

10. Method of coloring cinematographic films having a preferentially absorptive surface, which comprises treating the same with a coloring substance susceptible to preferential absorption by the surface, removing the color substance deposited in the first treatment to below the maximum of selective light absorption, and subjecting the surface to a second treatment with a color substance, the second treatment being characterized by a shorter period of duration than the first, and the employment of a color substance bearing a predetermined relationship to the preferential absorption properties of the surface to be treated therewith.

11. Method of coloring cinematographic films having a preferentially absorptive surface, which comprises treating the same with a coloring substance susceptible to preferential absorption by the surface, removing the color substance deposited in the first treatment to below the maximum of selective light absorption, and subjecting the surface to a second treatment with a color substance, the second treatment being characterized by the employment of a color substance in a condition of greater liquid dilution than the first and by bearing a predetermined relationship to the preferential absorption properties of the surface to be treated therewith.

12. Method of coloring cinematographic films having a preferentially absorptive surface, which comprises treating the same with a coloring substance susceptible to preferential absorption by the surface, removing the color substance deposited in the first treatment to below the maximum of selective light absorption, and subjecting the surface to a second treatment with a color substance, the second treatment being characterized by a shorter period of duration than the first, and the employment of a color substance in a condition of greater liquid dilution than the first and by bearing a predetermined relationship to the preferential absorption properties of the surface to be treated therewith.

13. Method of coloring cinematographic films having a preferentially absorptive surface, which comprises treating the same with a coloring substance susceptible to preferential absorption by the surface, washing out the color substance deposited in the first treatment to below the maximum of selective light absorption, and subjecting the surface to a second treatment with a color substance, the second treatment being characterized by effecting a lesser degree of color absorption than the first.

14. Method of coloring cinematographic films, which comprises wetting the same with a dye solution, washing, and subjecting the same to a second treatment with dye solution before making the imbibition impression.

15. Method of coloring cinematographic films, which comprises wetting the same with a dye solution in excess of its absorption capacity removing the dye somewhat below that corresponding to the maximum of selective light absorption and subjecting the film to a second treatment with a dye solution of a color supplementary to the first.

16. Method of coloring cinematographic films, which comprises wetting the same with a dye solution in excess of its absorption capacity removing the dye to below a concentration corresponding to its maximum of selective absorption of transmitted light, and subjecting the film to a second treatment of dye solution, the dye solution in the second treatment being supplementary to and of a lower concentration than in the first solution.

Signed by me at Boston, Massachusetts, this seventeenth day of May, 1928.

LEONARD T. TROLAND.